US008215943B2

(12) United States Patent
Tsai et al.

(10) Patent No.: US 8,215,943 B2
(45) Date of Patent: Jul. 10, 2012

(54) HEAT-TRANSFER LABEL ASSEMBLY AND APPARATUS FOR APPLYING HEAT-TRANSFER LABELS

(75) Inventors: Kuolih Tsai, Arcadia, CA (US);
Dong-Tsai Hseih, Arcadia, CA (US);
Yi-Hung Chiao, Temple City, CA (US);
Alan Morgenthau, Keene, NH (US);
Roger Recupero, Pomona, CA (US);
Julio Adalberto De La Cruz Escobar, San Salvador (SV)

(73) Assignee: Avery Dennison Corporation, Pasadena, CA (US)

( * ) Notice: Subject to any disclaimer, the term of this patent is extended or adjusted under 35 U.S.C. 154(b) by 866 days.

(21) Appl. No.: 11/452,595

(22) Filed: Jun. 14, 2006

(65) Prior Publication Data
US 2007/0281137 A1  Dec. 6, 2007

Related U.S. Application Data

(60) Provisional application No. 60/810,227, filed on Jun. 1, 2006.

(51) Int. Cl.
*B29C 59/02* (2006.01)
(52) U.S. Cl. ........ 425/385; 425/128; 425/369; 425/384; 425/394; 425/519; 264/21; 264/284; 264/293
(58) Field of Classification Search ................. 425/363, 425/369, 375, 385, 500, 520, 521, 182, 193, 425/518, 519, 116, 123, 125, 126.1, 126.2, 425/127, 128, 384, 403, 394; 156/542; 264/21, 264/284, 293
See application file for complete search history.

(56) References Cited

U.S. PATENT DOCUMENTS

| 2,267,372 A | * | 12/1941 | Calkins et al. | ................. | 419/33 |
| 2,807,564 A | * | 9/1957 | Mitchell | ........................ | 428/79 |
| 2,874,499 A | | 2/1959 | Gottscho et al. | | |
| 3,168,430 A | | 2/1965 | Almasi | | |

(Continued)

FOREIGN PATENT DOCUMENTS

WO    WO 03/049915 A1    6/2003
(Continued)

*Primary Examiner* — Joseph Del Sole
*Assistant Examiner* — Seyed Masoud Malekzadeh
(74) *Attorney, Agent, or Firm* — Kriegsman & Kriegsman

(57) ABSTRACT

A heat-transfer label assembly and an apparatus for applying heat-transfer labels. In a preferred embodiment, the heat-transfer label assembly includes a support. A plurality of labels are positioned over the support for transfer from the support to an article, each of the labels including an ink design. A plurality of spacers are positioned over the support but not over the label, the spacers not being transferable with the labels from the support to an article. The distance from the top of the spacers to the support exceeds the distance from the top of the labels to the support so that, when the assembly is wound into a roll, the labels do not come into contact with the bottom surface of an underlying portion of the support. In a preferred embodiment, the apparatus for applying heat-transfer labels includes a pad, a die-mark reduction device on the pad, a heated die positioned over the pad, and a motor for moving the heated die into and out of engagement with the die-mark reduction device. One type of die-mark reduction device has a top that includes a plurality of recesses spaced apart from one another, the recesses constituting non-contact areas with the die, the spaces between the recesses constituting contact areas with the die.

28 Claims, 8 Drawing Sheets

U.S. PATENT DOCUMENTS

| | | | | |
|---|---|---|---|---|
| 3,366,042 | A * | 1/1968 | Birch | 101/27 |
| 3,372,436 | A * | 3/1968 | Davis | 425/346 |
| 3,432,374 | A * | 3/1969 | Chance et al. | 156/366 |
| 3,543,331 | A * | 12/1970 | Brown et al. | 425/142 |
| 3,546,741 | A * | 12/1970 | Sorensen et al. | 425/128 |
| 3,738,418 | A * | 6/1973 | Harris | 164/245 |
| 3,787,274 | A * | 1/1974 | Genma | 428/64.2 |
| 3,830,374 | A * | 8/1974 | Kassimir | 211/1 |
| 3,935,359 | A * | 1/1976 | Rowland | 428/172 |
| 3,969,063 | A * | 7/1976 | Dantowitz | 425/520 |
| 4,024,011 | A * | 5/1977 | Crankshaw et al. | 156/299 |
| 4,043,858 | A * | 8/1977 | Dantowitz | 156/251 |
| 4,236,954 | A * | 12/1980 | Edwards | 156/352 |
| 4,253,891 | A * | 3/1981 | Brussel | 156/60 |
| 4,256,795 | A | 3/1981 | Day et al. | |
| 4,348,252 | A * | 9/1982 | Knoop et al. | 156/538 |
| 4,392,913 | A * | 7/1983 | Baumli | 156/584 |
| 4,470,795 | A * | 9/1984 | Prusak | 425/384 |
| 4,478,769 | A | 10/1984 | Pricone et al. | |
| 4,486,363 | A * | 12/1984 | Pricone et al. | 264/1.36 |
| 4,572,758 | A * | 2/1986 | Wild | 156/256 |
| 4,657,419 | A * | 4/1987 | Takakuwa | 400/490 |
| 4,680,082 | A * | 7/1987 | Kearney | 156/497 |
| 4,738,814 | A * | 4/1988 | Bowles et al. | 264/297.5 |
| 4,793,792 | A * | 12/1988 | Akino | 425/385 |
| 4,830,599 | A * | 5/1989 | Okusau et al. | 425/521 |
| 5,100,491 | A | 3/1992 | Ijiri et al. | |
| 5,123,987 | A * | 6/1992 | Mattia | 156/234 |
| 5,141,586 | A * | 8/1992 | Myers et al. | 156/358 |
| 5,156,863 | A | 10/1992 | Pricone et al. | |
| 5,184,907 | A * | 2/1993 | Hamada et al. | 400/635 |
| 5,232,653 | A * | 8/1993 | Addeo et al. | 264/515 |
| 5,254,302 | A * | 10/1993 | Yamanaka | 264/129 |
| 5,300,181 | A * | 4/1994 | Yamaguchi | 156/542 |
| 5,342,461 | A * | 8/1994 | Murphy | 156/64 |
| 5,372,758 | A * | 12/1994 | Lundstrom et al. | 264/1.25 |
| 5,423,705 | A * | 6/1995 | Solomon, II | 446/46 |
| 5,435,862 | A * | 7/1995 | Williams et al. | 156/64 |
| 5,472,543 | A * | 12/1995 | Yokajity | 156/249 |
| 5,540,795 | A * | 7/1996 | Franklin et al. | 156/64 |
| 5,770,124 | A * | 6/1998 | Marecki et al. | 264/1.36 |
| 5,813,772 | A | 9/1998 | Magill et al. | |
| 5,814,355 | A * | 9/1998 | Shusta et al. | 425/373 |
| 5,843,252 | A * | 12/1998 | Murphy | 156/64 |
| 5,865,918 | A * | 2/1999 | Franklin et al. | 156/64 |
| 6,021,559 | A * | 2/2000 | Smith | 29/557 |
| 6,063,320 | A * | 5/2000 | Horikawa | 264/297.4 |
| 6,277,470 | B1 * | 8/2001 | Smith et al. | 428/167 |
| 6,533,887 | B1 * | 3/2003 | Smith et al. | 156/268 |
| 6,540,367 | B1 * | 4/2003 | Benson et al. | 359/530 |
| 6,869,195 | B2 * | 3/2005 | Hannington | 359/614 |
| 6,877,542 | B2 * | 4/2005 | Huseby et al. | 156/581 |
| 6,908,295 | B2 * | 6/2005 | Thielman et al. | 425/371 |
| 6,990,723 | B1 * | 1/2006 | Hoogland | 29/527.1 |
| 7,261,424 | B2 * | 8/2007 | Smith | 359/529 |
| 7,261,425 | B2 * | 8/2007 | Benson et al. | 359/530 |
| 7,323,990 | B2 * | 1/2008 | Urban | 340/572.1 |
| 7,407,378 | B2 * | 8/2008 | Brum | 425/515 |
| 7,433,105 | B2 * | 10/2008 | Mau et al. | 359/15 |
| 7,470,386 | B2 * | 12/2008 | Kang et al. | 264/227 |
| 2002/0028263 | A1 * | 3/2002 | Luttrell et al. | 425/193 |
| 2002/0167114 | A1 * | 11/2002 | Berry | 264/322 |
| 2004/0104506 | A1 * | 6/2004 | Schelmbauer et al. | 264/163 |
| 2004/0173920 | A1 * | 9/2004 | Erickson et al. | 264/1.6 |
| 2005/0100689 | A1 | 5/2005 | He et al. | |
| 2005/0153113 | A1 | 7/2005 | Hseih et al. | |
| 2007/0015179 | A1 * | 1/2007 | Klapperich et al. | 435/6 |

FOREIGN PATENT DOCUMENTS

| | | |
|---|---|---|
| WO | WO 2004/050262 A1 | 6/2004 |
| WO | WO 2005/068174 A1 | 7/2005 |

* cited by examiner

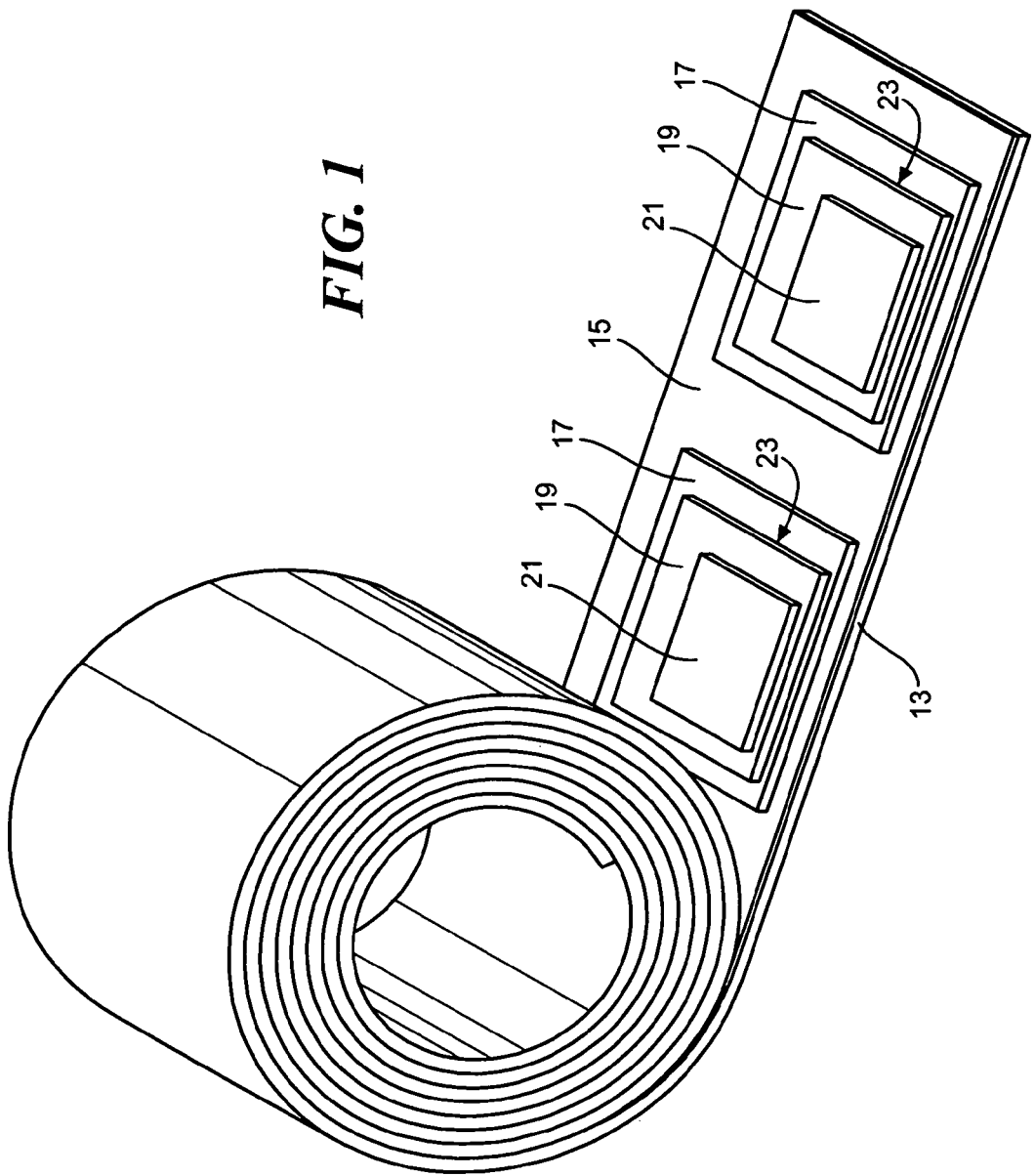

HEAT-TRANSFER LABEL ASSEMBLY AND APPARATUS FOR APPLYING HEAT-TRANSFER LABELS

CROSS-REFERENCE TO RELATED APPLICATIONS

The present application claims the benefit under 35 U.S.C. 119(e) of U.S. Provisional Patent Application Ser. No. 60/810,227, filed Jun. 1, 2006, the disclosure of which is incorporated herein by reference.

BACKGROUND OF THE INVENTION

The present invention relates generally to heat-transfer labels and relates more particularly to a new heat-transfer label assembly and to a new apparatus for applying heat-transfer labels to articles.

It is customary for manufacturers of garments and other finished fabrics (e.g., towels, bed linens, tablecloths, etc.) to attach thereto one or more labels that display various items of information, such as article size, fiber content, instructions for care, and the manufacturer's name or trademark. Such labels, which are to be contrasted with hanging price tags and the like, are typically not intended to be removed by the consumer after the purchase of the article, but rather, are intended to be permanently affixed to the article. In fact, such labels are commonly known in the industry as permanent care labels and typically comprise a small piece of cloth which is sewn directly onto the article, said small piece of cloth bearing the information described above.

Unfortunately, the presence of a permanent care label on certain articles, such as undergarments or other garments in which the label is in direct contact with the wearer's skin, can become irritating to the wearer. As a result, it is not uncommon for a wearer of such a garment to remove the permanent care label, typically by cutting or simply by ripping the permanent care label from the garment. However, as can readily be appreciated, such a practice not only results in a loss of the information contained on the label but the act of cutting or ripping the permanent care label from the garment can also result in significant damage to the garment, itself.

One approach to this problem has been to replace the aforementioned permanent care cloth label sewn onto the garment with a heat-transfer label applied to the garment. For example, in U.S. Patent Application Publication No. US 2005/0100689A1, inventors He et al., which was published May 12, 2005, and which is incorporated herein by reference, there is disclosed a heat-transfer label assembly that is well-suited for use in labeling fabrics. In one embodiment, the heat-transfer label assembly of the aforementioned patent application comprises a support portion, a wax layer, and a transfer portion. The support portion includes a carrier and a release coating, the release coating being applied to the top surface of the carrier. The wax layer is printed onto a desired area of the release coating. The transfer portion, which is printed directly onto the wax layer, comprises an adhesive layer printed directly onto the wax layer and an ink design layer printed directly onto the adhesive layer. The ink design layer may include a first portion that conveys fixed or non-variable information for a class of articles (e.g., manufacturer trademark, care instructions for articles differing only in size, etc.) and a second portion that conveys variable information that is specific to a single label or to a subset of labels. Examples of such variable information include serial numbers uniquely identifying each label; product characteristics, such as the size of each such article of clothing (e.g., S, M, L, etc.), style, fiber type, etc.; pricing information; identification or location of a manufacturer or distributor; and authenticity information. The non-variable information may be formed, for example, by screen printing, and the variable information may be formed, for example, using a variable printing technique.

The above-described heat-transfer label assembly may include a number of transfer portions (i.e., labels) positioned on a common support portion, the individual transfer portions being spaced apart from one another at regular intervals. For example, referring to FIG. 1, there is shown a perspective view of a heat-transfer label assembly of the type described above, said heat-transfer label assembly being shown partially wound into a roll and being represented generally by reference numeral 11. Assembly 11 comprises a carrier 13 and a release coating 15, release coating 15 being applied to the entire top surface of carrier 13. A plurality of wax areas 17 are printed at regular intervals onto the exposed surface of release coating 15. A heat-activatable adhesive layer 19 is printed directly onto an exposed area of each wax layer 17, and an ink design layer 21 is printed directly onto an exposed area of each adhesive layer 19, the combination of adhesive layer 19 and ink design layer 21 forming a transfer portion 23. (In another common type of heat-transfer label assembly, the adhesive layer is positioned over the ink design layer. A protective layer may additionally be positioned under the ink design layer.)

The transfer portion of a heat-transfer label assembly is typically transferred to an article using a heat-transfer label apparatus (also commonly referred to as a "bonder"). Examples of bonders include Avery Dennison Heat Transfer Bonder Model Nos. TH-2000 and M79200-00-3 (Avery Dennison Corporation, Pasadena, Calif.). In addition, a bonder is disclosed in U.S. Pat. No. 5,813,772, inventors Magill et al., which issued Sep. 29, 1998, and which is incorporated herein by reference. A conventional bonder typically includes a stationary pad and a movable, heated die. The stationary pad is typically flat and is made of a compressible material, such as silicone rubber. The movable die is also typically flat and is made of a rigid, heat-conductive material, such as aluminum. A motor is coupled to the die and is used to repeatedly move the die into contact with and out of contact with the pad.

Referring now to FIGS. 2(a) through 2(d), there is schematically shown the manner in which a fabric article A, such as a garment or other finished fabric, may be labeled using assembly 11 and a conventional bonder 51. First, as seen in FIG. 2(a), the article A is positioned on top of a flat pad 53 of bonder 51. Next, as seen in FIG. 2(b), a label assembly 11 is partially unwound from a roll, and one of the transfer portions 23 of assembly 11 is positioned over an area of article A that one wishes to label. Next, as seen in FIG. 2(c), a motor 54 moves a heated die 55 down towards pad 53 and into contact with label assembly 11, die 55 heating label assembly 11 and pressing label assembly 11 against article A and pad 53 in such a way as to cause transfer portion 23 to be transferred from the remainder of label assembly 11 to article A. (A portion of wax layer 17 may also be transferred with transfer portion 23 onto article A.) Next, as seen in FIG. 2(d), motor 54 moves heated die 55 upwardly away from the remainder of label assembly 11, as well as from the article A and pad 53, thereby leaving transfer portion 23 on the article A.

In general, the process described above works well; however, it is not uncommon for the process to result in an easily observable die-mark (i.e., impression) being left on the article over the entire area that was compressed between the heated die and the pad (see, for example, stippling representing die-mark 61 in FIGS. 3(a) and 3(b)). Such a die-mark is particularly perceptible on dark-colored articles and detracts from the appearance of the labeled article, especially on the reverse side of the article, where the die-mark is observable but the label is not. Moreover, because the reverse side of an article is often the exterior surface of the article (most garment labels being positioned on the interior surface of the garment), the appearance of a die-mark is particularly undesirable.

In addition to the undesired formation of die-marks, another problem associated with the process described above is that the label assembly, once wound into a roll, has a tendency to bond to itself (a phenomenon known in the industry as "blocking"). Such blocking may adversely affect the capacity of the roll to be unwound and/or may cause labels to be transferred to the back side of the carrier as the roll is being unwound (a phenomenon known in the industry as "pre-dispensing").

SUMMARY OF THE INVENTION

According to one aspect of the invention, there is provided a heat-transfer label assembly, the heat-transfer label assembly comprising (a) a support; (b) a label positioned over the support for transfer from the support to an article, the label having a top and comprising an ink design; and (c) a spacer positioned over the support but not over the label, the spacer not being transferable with the label from the support to an article, the spacer having a top, wherein the distance from the top of the spacer to the support exceeds the distance from the top of the label to the support.

In a preferred embodiment, the heat-transfer label assembly comprises a support preferably made of polyethylene terephthalate. The support is preferably an elongated, flattened member having a leading end, a trailing end, a top surface, a bottom surface, and a pair of sides. A plurality of wax areas are printed directly onto the top surface of the support and are spaced apart from one another at regular intervals, the wax areas being spaced inwardly from the sides of the support to define side margins. Each wax area serves to facilitate the release of a label positioned thereover when said label is subjected to conditions of heat and pressure. Preferably, each wax area has a dry thickness of about 3-10 microns and is formed by screen printing a suitable wax composition onto the support. A label is printed on top of each wax area. The labels may or may not be identical to one another and may include fixed information and/or variable information. The labels may consist of an ink design layer printed directly onto its corresponding wax area, the ink design layer preferably having a dry thickness of about 20 microns and preferably being formed by screen printing a suitable ink composition onto the wax area. The assembly further includes a plurality of sensing marks printed directly onto the top surface of the support at regularly spaced intervals. The marks are not intended to be transferred from the support to an article, but rather, are used for registration purposes, for example, (i) by printers so that variable information may be printed, where desired, onto the labels and (ii) by bonders so that the labels may be correctly aligned with and transferred to an article. Each mark preferably has a dry thickness of about 20 microns and preferably is formed by screen printing a suitable ink composition onto the support. The assembly further includes spacer bars printed directly onto the top surface of the support. The spacer bars are dimensioned to have a thickness that exceeds the combined thickness of the wax area and the label so that, when the assembly is wound into a roll in the customary fashion, the labels do not come into contact with the bottom surface of an underlying portion of the support. Accordingly, where the wax area and the label have a combined thickness of about 25-30 microns, each of the spacer bars preferably has a thickness of about 40 microns. In addition, the spacer bars are preferably endowed with a certain degree of stiffness so as to resist compression and are preferably chemically bonded to the support so as to avoid being transferred.

The present invention is also directed at a novel apparatus for applying heat-transfer labels to articles.

This aspect of the present invention is based, in part, on the recognition by the present inventors that the visibility of a die-mark on a labeled article, such as a fabric article, is attributable to the substantially uniform compression of that portion of the article that is sandwiched between the die and the pad of the bonder. This substantially uniform compression of the sandwiched region results in comparatively less scattered light and comparatively more specularly reflected light than from surrounding areas of the sandwiched region, thereby making the sandwiched region optically distinguishable from its surrounding areas. The present inventors have further discovered that one may inhibit the formation of a prominent die-mark on a labeled article, such as a fabric article, without adversely affecting label transfer, by inhibiting the uniform compression of the region sandwiched between the die and the pad of the bonder.

Therefore, according to one aspect of the invention, there is provided an apparatus for applying a heat-transfer label to an article, the apparatus comprising (a) a pad; (b) a die-mark reduction device, the die-mark reduction device being positioned over the pad, the die-mark reduction device having a top, the top being contoured to include at least one contact area and at least one non-contact area; (c) a heated die, the heated die being positioned over the die-mark reduction device; and (d) means for moving the heated die into and out of engagement with the at least one contact area of the die-mark reduction device, the heated die not engaging the at least one non-contact area of the die-mark reduction device.

In a preferred embodiment, the die-mark reduction device may comprise a nickel retroreflective sheeting mold.

According to another aspect of the invention, there is provided an apparatus for applying a heat-transfer label to an article, the apparatus comprising (a) a heated die; (b) means for engaging the heated die so as to press an article therebetween, the engaging means having a face contoured to include at least one contact area and at least one non-contact area; and (c) means for moving the heated die into and out of engagement with the engaging means, wherein, when the heated die is in engagement with the engaging means, the heated die does not engage the at least one non-contact area.

The above-described engaging means may comprise a pad and a die-mark reduction device positioned over the pad, the die-mark reduction device preferably having a contoured surface having at least one contact area and at least one non-contact area; alternatively, the engaging means may comprise a pad that, itself, has a contoured surface having at least one contact area and at least one non-contact area.

For purposes of the present specification and claims, it is to be understood that certain terms used herein, such as "on" or "over," when used to denote the relative positions of elements in a heat-transfer label, are primarily used to denote such relative positions in the context of how those elements are situated prior to transfer of the transfer portion of the label to an article since, after transfer, the positions of those elements may be reversed or otherwise differ.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts:

FIG. 1 is a perspective view of a conventional heat-transfer label assembly, the heat-transfer label assembly being shown partially wound into a roll;

DETAILED DESCRIPTION OF PREFERRED EMBODIMENTS

Figure 2B:
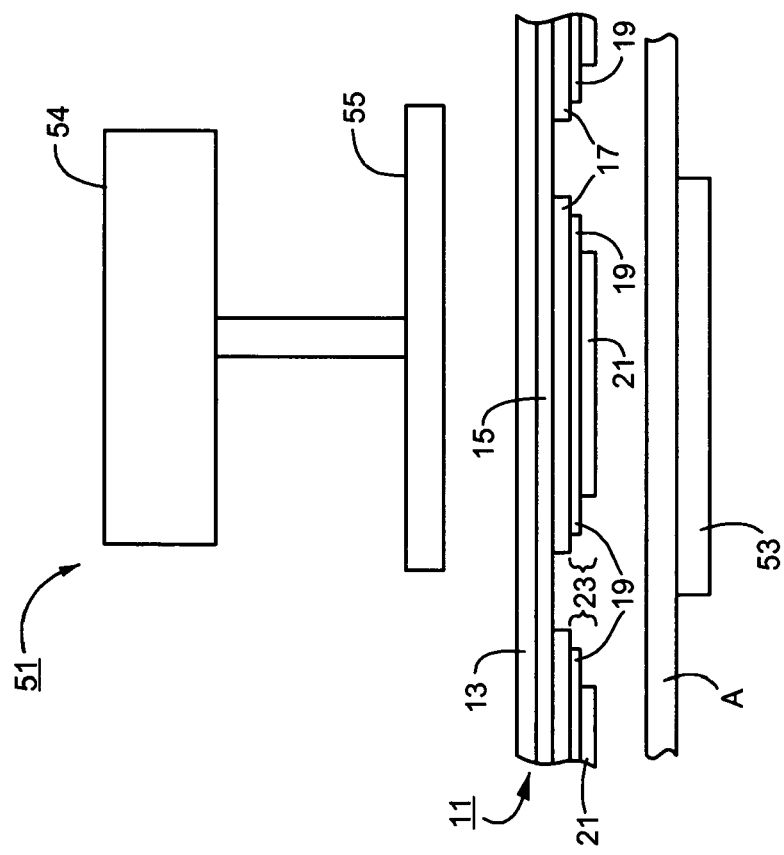
FIGS. 2(a) through 2(d) are schematic side views showing one manner in which the heat-transfer label assembly of FIG. 1 may be used to label an article of fabric.
Figure 2A:
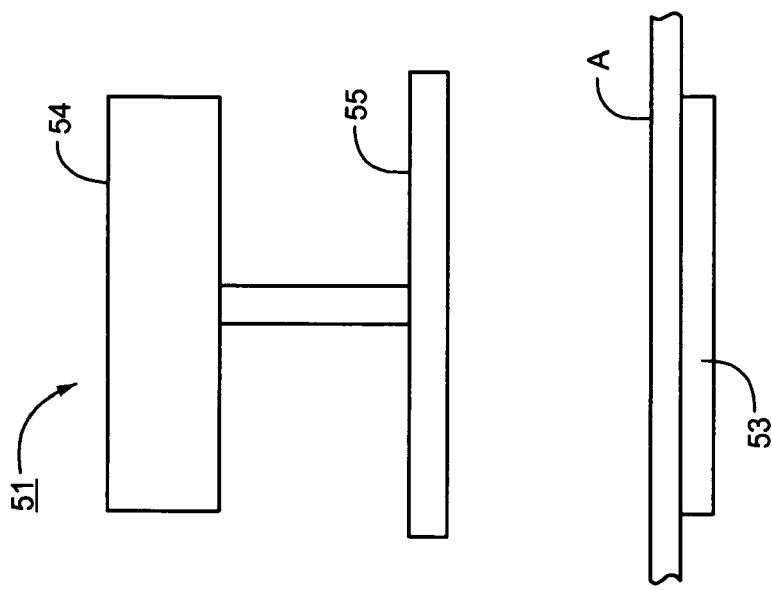
Figure 2D:
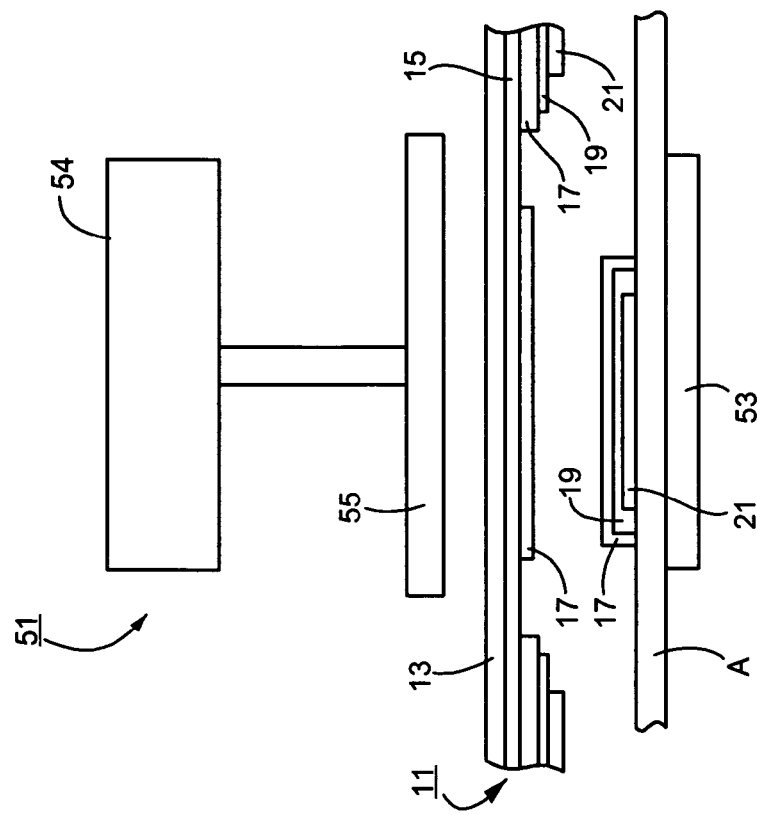
Figure 2C:
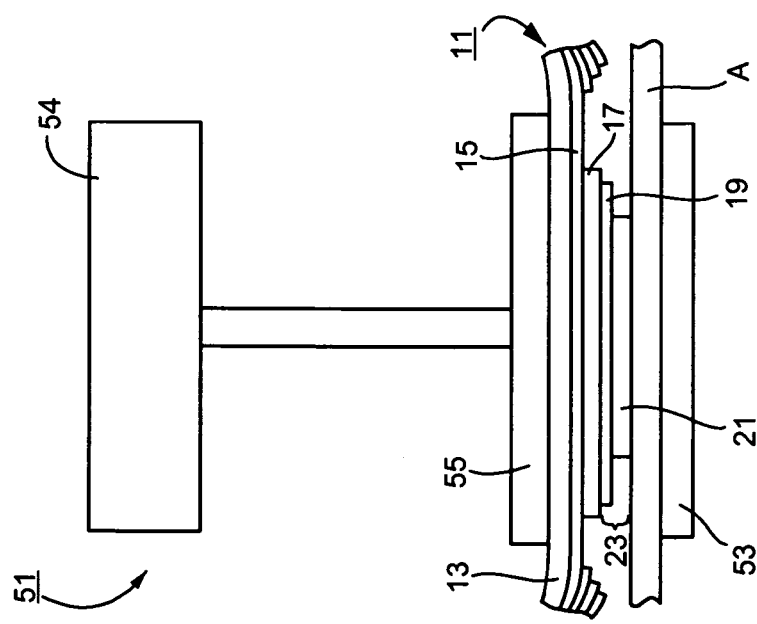
Figure 3A:
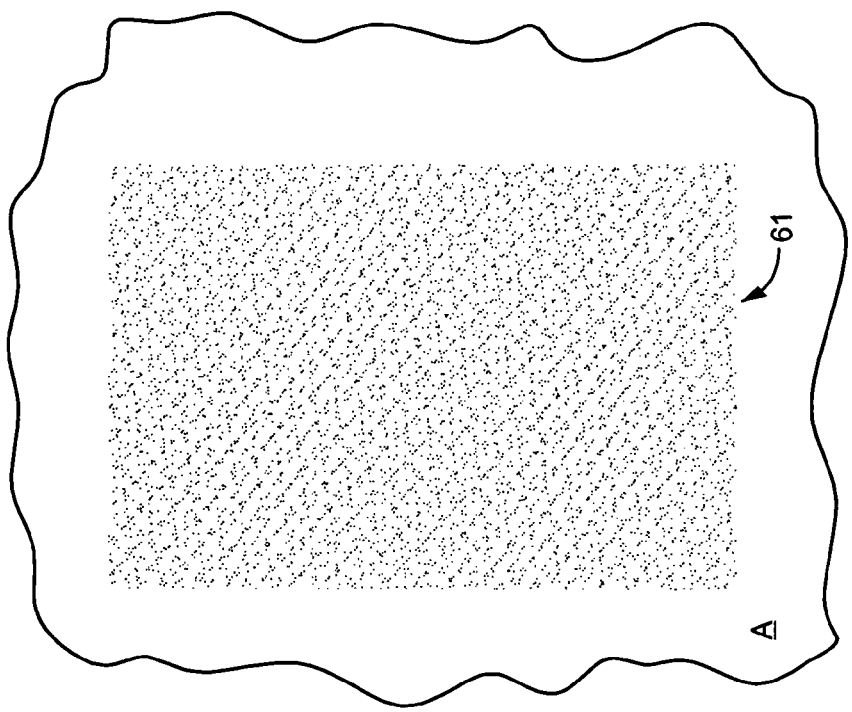
FIGS. 3(a) and 3(b) are fragmentary label side and reverse side views, respectively, of the article of fabric labeled according to the method shown in FIGS. 2(a) through 2(d)
Figure 3B:
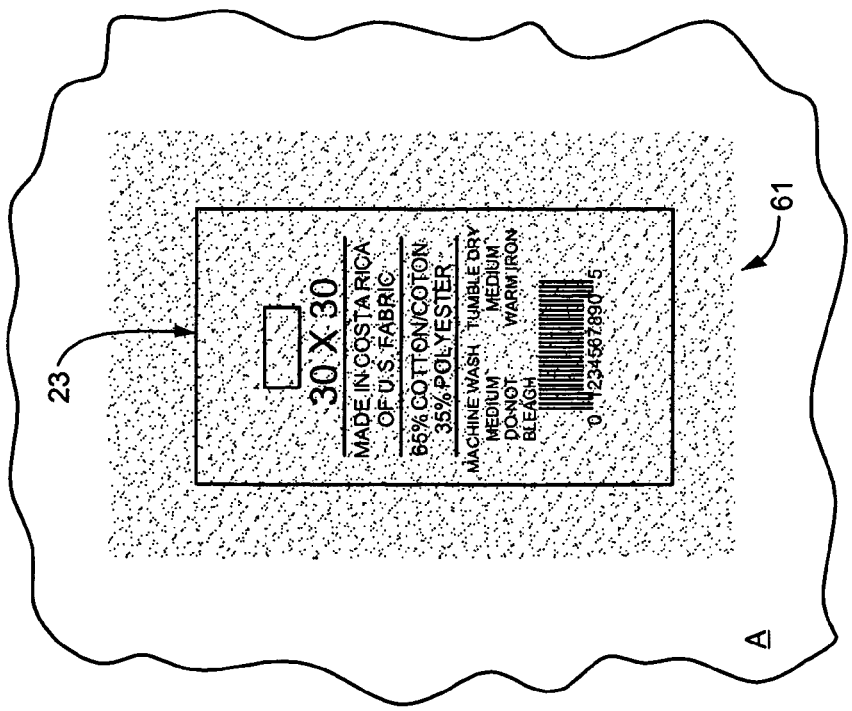
Figure 4A:
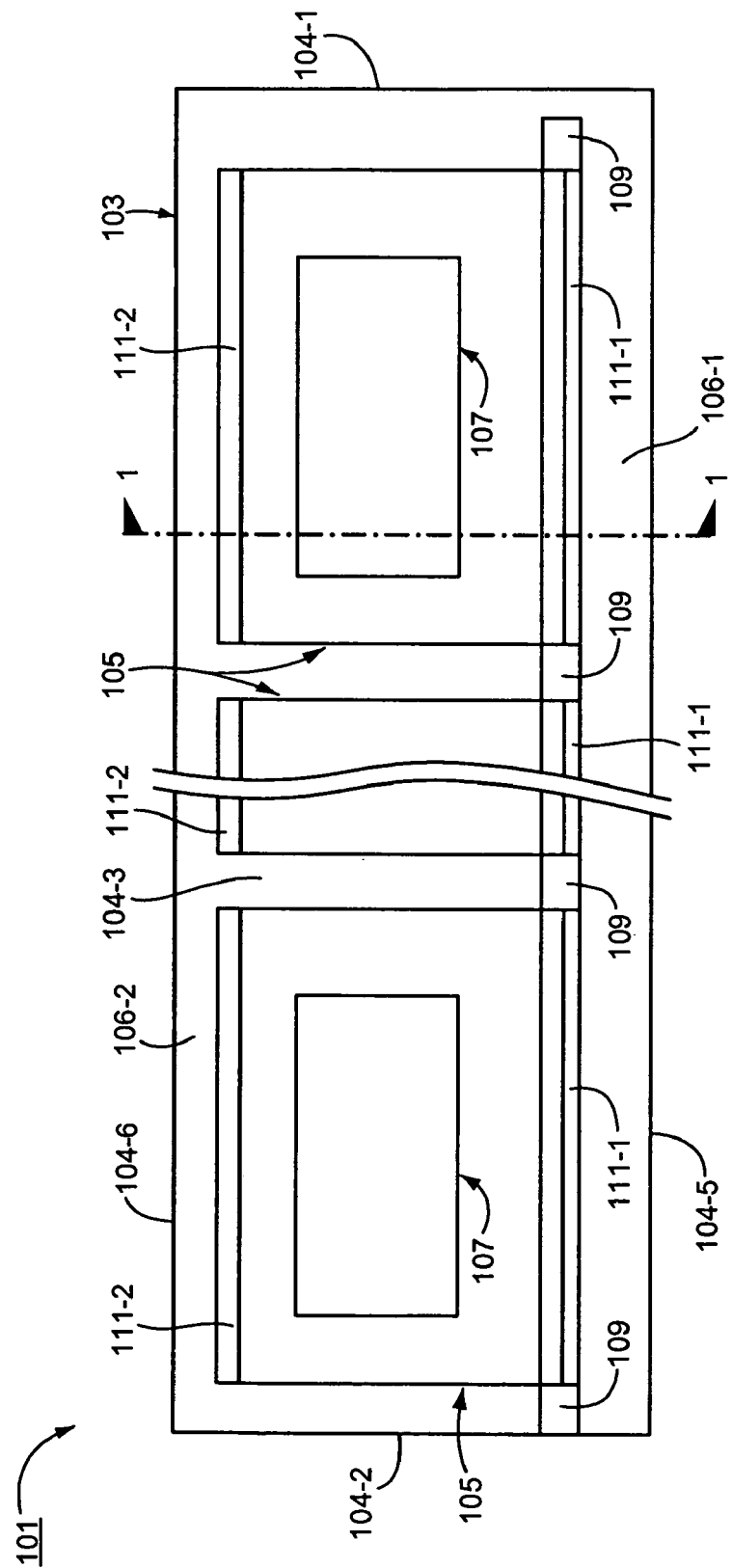
FIG. 4(a) is a fragmentary top view of one embodiment of a heat-transfer label assembly constructed according to the teachings of the present invention.
Figure 4B:
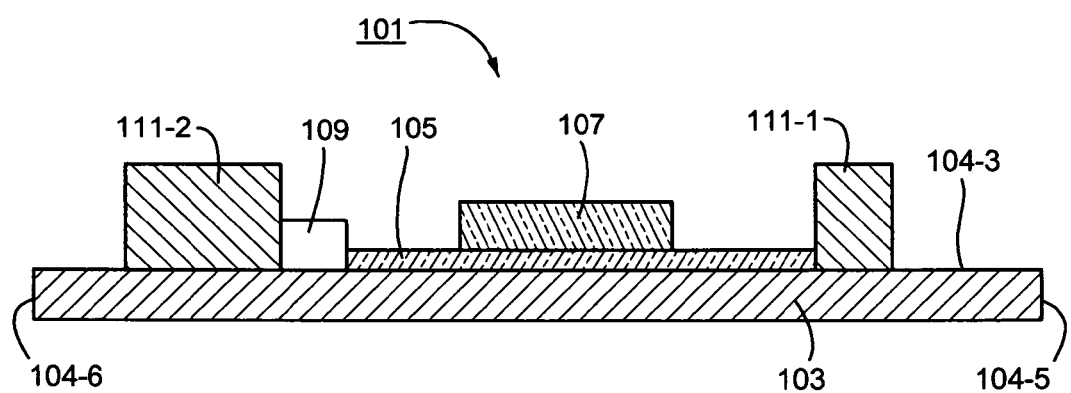
FIG. 4(b) is an enlarged transverse section view, taken along line 1-1, of the heat-transfer label assembly of FIG. 4(a)

Referring now to FIGS. 4(a) and 4(b), there are shown fragmentary top and enlarged transverse section views, respectively, of a first embodiment of a heat-transfer label assembly constructed according to the teachings of the present invention, the heat-transfer label assembly being represented generally by reference numeral 101.

Assembly 101 comprises a support 103, support 103 being a flat, elongated member having a leading end 104-1, a trailing end 104-2, a top surface 104-3, a bottom surface 104-4, and a pair of sides 104-5 and 104-6. Support 103 may be a paper substrate, a polymer-coated paper substrate, or a polymer film substrate. In the present embodiment, support 103 is an elongated polyethylene terephthalate (PET) film, support 103 preferably being optically clear so that one can inspect the quality of printed matter on support 103 by looking at said printed matter through support 103 (from which perspective said printed matter appears as it will on the labeled article), as opposed to looking at said printed matter from the printed side of the support 103 (from which perspective said printed matter appears as the mirror image of what will appear on the labeled article). Support 103 preferably has a thickness of about 0.5-7 mil, more preferably about 0.9-3.0 mil, even more preferably about 1.4-2 mil.

Assembly 101 additionally includes a plurality of wax areas 105 printed directly onto top surface 104-3 of support 103 and spaced apart from one another at regular intervals, wax areas 105 being spaced inwardly from sides 104-5 and 104-6 of support 103 to define side margins 106-1 and 106-2. Each wax area 105 serves to facilitate the release of a label positioned thereover when said label is subjected to conditions of heat and pressure. Preferably, each wax area 105 has a dry thickness of about 3-10 microns and is formed by screen printing (preferably using a 215 mesh screen) a suitable wax composition onto support 103. An example of a suitable wax composition comprises 100 parts of HD-2120 polyurethane additive (Hauthaway Corporation, Lynn, Mass.) and 1000 parts of a composition consisting of 700 parts ME48040M2 wax emulsion (Michaelman, Cincinnati, Ohio), 300 parts PWR-25 polyester copolymer binder (Evco Research, Atlanta, Ga.), and 20 parts Tafigel PUR61 viscosity adjustment agent (Ultra Additives, Bloomfield, N.J.). The aforementioned wax composition is preferably printed to a wet thickness of about 20 microns and then allowed to dry.

Assembly 101 further includes a plurality of labels 107, each label 107 being printed on top of a corresponding wax area 105. Labels 107 may or may not be identical to one another and may include fixed information and/or variable information. In the present embodiment, each label 107 consists of an ink design layer printed directly onto a wax area 105, the ink design layer preferably having a dry thickness of about 20 microns and preferably being formed by screen printing (preferably using a 165 mesh screen) a suitable ink composition onto wax area 105. An example of an ink composition suitable for printing the aforementioned ink design layer comprises 1000 parts Geon 137 PVC resin powder (PolyOne Corporation, Avon Lake, Ohio), 1400 parts butylbenzyl phthlate plasticizer, 400 parts Extra White colorant (Polyone Corporation, Avon Lake, Ohio), and 38 parts Velvet Black colorant (PolyOne Corporation, Avon Lake, Ohio). Another example of a suitable ink composition comprises 1000 parts Geon 137 PVC resin (Polyone Corporation, Avon Lake, Ohio), 1400 parts butylbenzyl phthlate plasticizer, 400 parts Velvet Black colorant (Polyone Corporation, Avon Lake, Ohio), and 26 parts B 1214 PVC stabilizer (Baerlocher USA, Dover, Ohio). Still another example of a suitable ink composition comprises 1000 parts Geon 137 PVC resin (Polyone Corporation, Avon Lake, Ohio), 700 parts butylbenzyl phthlate plasticizer, 700 parts di-octyl phthalate plasticizer, 400 parts Velvet Black colorant (Polyone Corporation, Avon Lake, Ohio), and 26 parts B1214 PVC stabilizer (Baerlocher USA, Dover, Ohio). It should be noted that the above-described compositions are exemplary only and that one could, for example, replace Geon 137 PVC resin with Geon 136 PVC resin and/or Geon 138 PVC resin or with PVC resins from other suppliers. Similarly, the above-described compositions could be modified by replacing plasticizers like butylbenzyl phthalate and di-octyl phthalate with one or more other plasticizers like dibutyl phthalate, di-isobutyl phthalate, diethylhexyl phthalate, dimethyl phthalate, di-isodecyl phthalate and di-isononyl phthalate.

Assembly 101 further includes a plurality of sensing marks 109, marks 109 being printed directly onto top surface 104-3 of support 103 at regularly spaced intervals. (In the present embodiment, marks 109 are positioned within side margin 106-1 at points corresponding to the spaces between adjacent wax areas 105; however, this placement of marks 109 is illustrative only, and marks 109 may be positioned elsewhere.) Marks 109 are not intended to be transferred from support 103 to an article, but rather, are used for registration purposes, for example, (i) by printers, such as thermal transfer printers, so that variable information may be printed, where desired, onto labels 107 and (ii) by bonders so that labels 107 may be correctly aligned with and transferred to an article. In the present embodiment, each mark 109 preferably has a dry thickness of about 20 microns and preferably is formed by screen printing (preferably using a 215 mesh screen) a suitable ink composition onto support 103. An example of an ink composition suitable for printing marks 109 comprises 1000 parts Geon 137 PVC resin (PolyOne Corporation, Avon Lake, Ohio), 1200 parts di-octyl phthlate plasticizer, 400 parts Velvet Black colorant (Polyone Corporation, Avon Lake, Ohio), 26 parts B1214 PVC stabilizer (Baerlocher USA, Dover, Ohio), and 78 parts Viscosity Buster viscosity adjustment agent (Eastman Chemical, Kingsport, Tenn.). It should be noted that the above-described composition is exemplary only and that one could, for example, replace Geon 137 PVC resin with Geon 136 PVC resin and/or Geon 138 PVC resin or with PVC resins from other suppliers. Similarly, the above-described composition could be modified by replacing plasticizers like butylbenzyl phthalate and di-octyl phthalate with one or more other plasticizers like dibutyl phthalate, di-isobutyl phthalate, diethylhexyl phthalate, dimethyl phthalate, di-isodecyl phthalate and di-isononyl phthalate.

Assembly 101 further includes corresponding pairs of spacer bars 111-1 and 111-2, spacer bars 111-1 and 111-2 being printed directly onto top surface 104-3 of support 103. Each spacer bar 111-1 is positioned within margin 106-1, and each spacer bar 111-2 is positioned within margin 106-2, with each pair of spacer bars 111-1 and 111-2 extending substantially the length of a wax area 105 and oriented substantially parallel thereto. Each of spacer bars 111-1 and 111-2 is dimensioned to have a thickness that exceeds the combined thickness of wax area 105 and label 107 so that, when assembly 101 is wound into a roll in the customary fashion, label 107 does not come into contact with bottom surface 104-4 of an underlying portion of support 103. Accordingly, in the present embodiment, where wax area 105 and label 107 have a combined thickness of about 25-30 microns, each of spacer bars 111-1 and 111-2 preferably has a thickness of about 40 microns.

Preferably, spacer bars 111-1 and 111-2 are endowed with a certain degree of stiffness so as to resist compression; in this manner, the spacing between each label 107 and the bottom surface 104-4 of an underlying portion of support 103 may be maintained. In addition, spacer bars 111-1 and 111-2 preferably do not adhere to the bottom surface 104-4 of an underlying portion of support 103 and do not transfer from top surface 104-3 of support 103 to the article being labeled. An example of a composition suitable for forming spacers bars 111-1 and 111-2 comprises 3 parts di-octyl phthalate, 3 parts butylbenzyl phthalate, 11.4 parts 12000TF PA Base PVC/plasticizer mixture (Polyone, Corporation, Avon Lake, Ohio), 5.4 parts Geon 137 PVC resin (PolyOne Corporation, Avon Lake, Ohio), and 1.14 parts Tyzor crosslinker (DuPont, Wilmington, Del.). Such a composition may be screen printed (preferably using a 75 mesh screen) onto support 103 in a sufficient amount to produce a dry thickness of about 40 microns. It should be noted that the above-described composition is exemplary only and that one could, for example, replace Geon 137 PVC resin with Geon 136 PVC resin and/or Geon 138 PVC resin or with PVC resins from other suppliers.

Similarly, the above-described composition could be modified by replacing plasticizers like butylbenzyl phthalate and di-octyl phthalate with one or more other plasticizers like dibutyl phthalate, di-isobutyl phthalate, diethylhexyl phthalate, dimethyl phthalate, di-isodecyl phthalate and di-isononyl phthalate.

To fabricate assembly 101, one preferably first prints spacer bars 111-1 and 111-2, then prints sensing marks 109, then prints wax areas 105, and then prints labels 107.

Assembly 101 may be used in the conventional manner to label articles. However, for the same reasons that are explained above, if a conventional bonder is used to transfer labels 107 from assembly 101 to articles of fabric, particularly dark-colored articles of fabric, an undesired die-mark may be left on the articles by the bonder.

Figure 5:
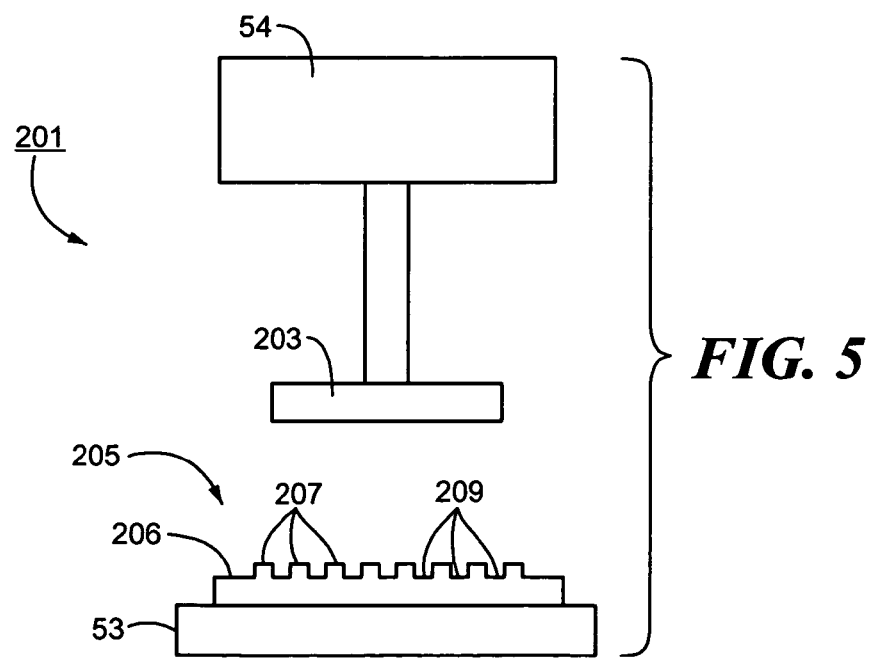
FIG. 5 is a schematic side view of one embodiment of an apparatus constructed according to the teachings of the present invention for applying a heat-transfer label to an article.

Referring now to FIG. 5, there is schematically shown a side view of one embodiment of a bonder constructed according to the teachings of the present invention, the bonder being represented generally by reference numeral 201.

Bonder 201 is similar in many respects to conventional bonder 51. More specifically, like bonder 51, bonder 201 includes a pad 53 and a motor 54. However, bonder 201 differs from bonder 51 in that (i) instead of including a die 55, bonder 201 includes a die 203 and (ii) bonder 201 additionally comprises a die-mark reduction device 205 positioned on top of pad 53.

Die 203 is similar to die 55, the principal difference between the two dies being that, whereas the footprint of die 55 is unrelated to the particular label being transferred, the footprint of die 203 corresponds generally to the footprint of the particular label being transferred, with the footprint of die 203 preferably extending about 2 mm beyond that of the label.

Die-mark reduction device 205 is a structure having a top face 206 that is contoured to provide both contact areas 207 and non-contact areas 209 within a region of an article that is sandwiched between pad 53 and die 203. In this manner, the non-contacted areas of the sandwiched region of the article do not become flattened between pad 53 and die 203. These unaffected (i.e., unflattened) areas of the article increase the amount of light scattered within the sandwiched region, thereby reducing the visibility of any die-mark formed. Die-mark reduction device 205 may be glued or otherwise secured to the top of pad 53.

Many different types of materials having an irregular surface may be used as device 205. A preferred class of materials comprises nickel retroreflective sheeting molds of the type disclosed in U.S. Pat. No. 4,478,769, inventors Pricone et al., issued Oct. 23, 1984; U.S. Pat. No. 5,156,863, inventors Pricone et al., issued Oct. 20, 1992; and PCT International Publication No. WO 03/049915, published Jun. 19, 2003, all of which are incorporated herein by reference. For example, a 3 inch×2 inch×1-2 mm portion of such a nickel retroreflective sheeting mold may be used as device 205.

Figure 6:
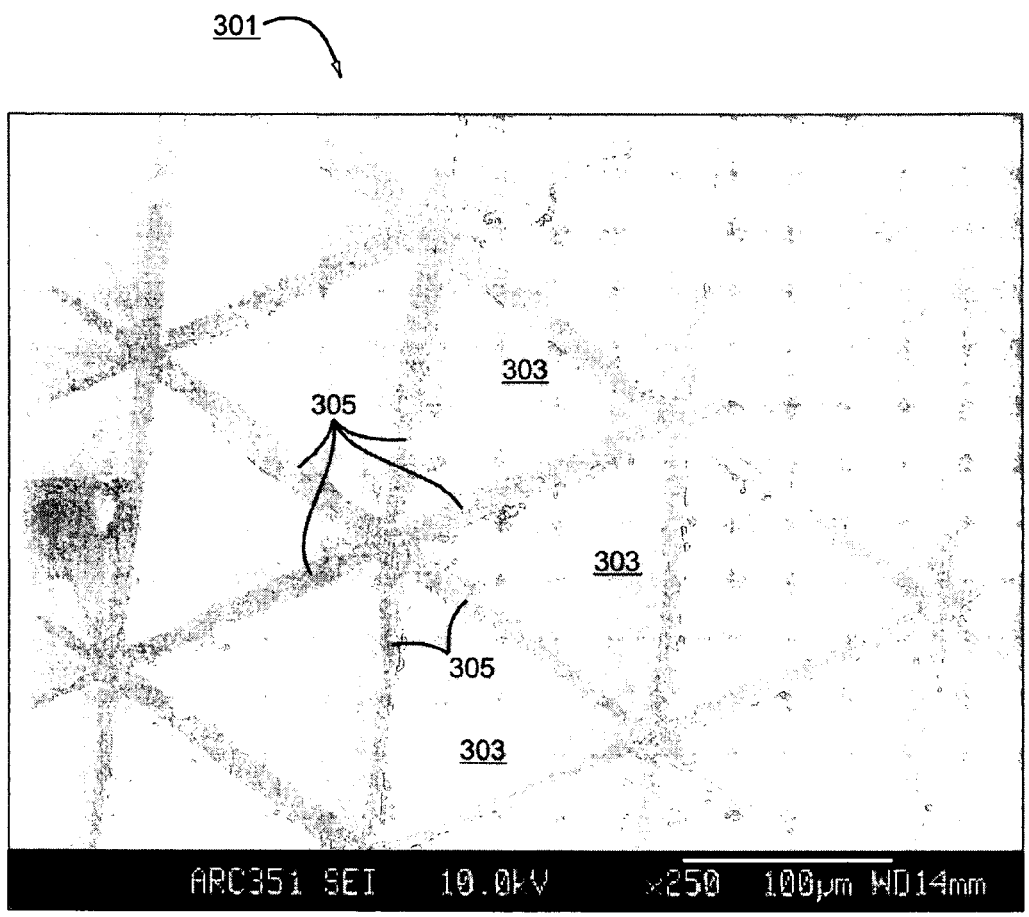
FIG. 6 is a micrograph of the top surface of one type of material suitable for use as the die-mark reduction device shown in FIG. 5.
Figure 7:
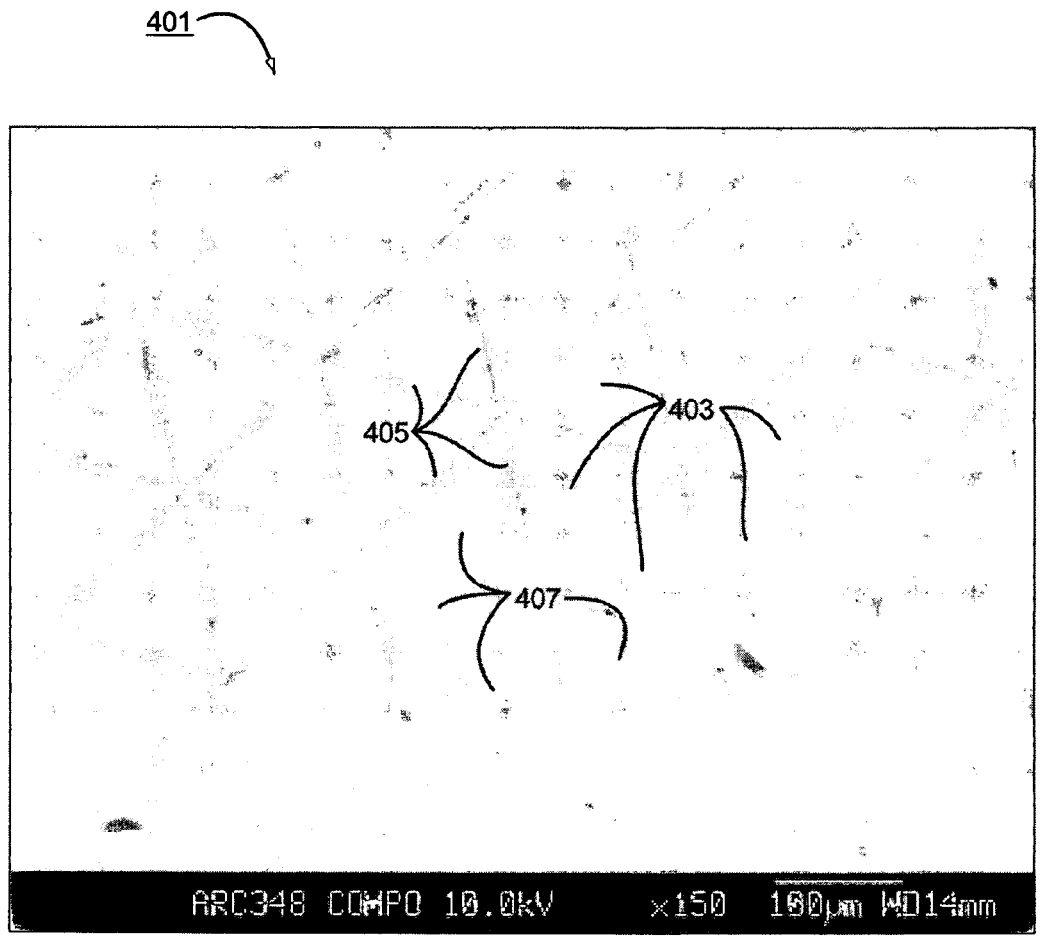
FIG. 7 is a micrograph of the top surface of another type of material suitable for use as the die-mark reduction device shown in FIG. 5.

Referring now to FIGS. 6 and 7, there are shown micrographs of two such nickel retroreflective sheeting molds. In FIG. 6, there is shown a fragment of a mold 301 having a repeating pattern of non-contact areas 303 and contact areas 305. Each non-contact area 303 is in the shape of a pyramidal recess or cell having a maximum width of approximately 125 microns and a maximum depth of approximately 100 microns. Each contact area 305 is formed by the space separating adjacent non-contact areas 303. In FIG. 7, there is shown a fragment of a mold 401 having a repeating pattern of contact areas 403 and non-contact areas 405. Each contact area 403 is formed by the apex of a pyramidal protrusion 407 having a maximum width of approximately 125 microns and a maximum height of approximately 100 microns. Each non-contact area 405 is formed by the space separating adjacent protrusions.

Although nickel retroreflective sheeting molds of the type discussed above are preferred materials for use as device 205, they are not the only types of materials that may be used. In general, preferred materials for use as device 205 tend to possess one or more of the following characteristics:

(1) High Non-Contact Area to Contact Area Ratio—Preferably, the ratio of non-contact area to contact area is greater than 1:1, respectively, more preferably in the range of about 1000:1 to 10:1, respectively.

(2) Depth of Non-Contact Area Relative to Contact Area—Preferably, the depth of the non-contact area relative to the contact area is sufficiently great so that, when portions of the article are pressed into the non-contact areas, these portions of the article do not contact the non-contact areas.

(3) Pitch—Where the material has a repeating pattern of contact areas and non-contact areas, the pitch of the contact areas is preferably within an order of magnitude of the pitch of a fabric article being labeled.

(4) Shape—Where the material has a repeating pattern of contact areas and non-contact areas, the non-contact areas may take the form of recesses or cells preferably having a shape, in plan view, that is triangular, square, hexagonal, rectangular or circular. Preferably, the side wall(s) of the cells have a steep gradient to inhibit contact between the walls of the cell and the article. Instead of taking the form of cells, the non-contact areas may take the form of a series of parallel lines or grooves.

(5) Male vs. Female Form—The material may take either a male form (in which case the contact areas represent protrusions from an otherwise flat, non-contacting surface) or a female form (in which case the contact areas represent a flat surface populated with non-contacting recesses). If a male form is used, the protrusions preferably do not possess sharp apices as such a shape may cause damage to the article when the protrusions are pressed against the article.

(6) Materials—Device 205 is preferably made of a material that is capable of withstanding repeated contact from die 203. In addition, device 205 is preferably made to be sufficiently flexible so that it maintains sufficient contact with die 205 over the footprint of the label to permit label transfer while, at the same time, being sufficiently resistant to compression that it maintains a desirable non-contact area to contact area ratio. Examples of materials suitable for use in making device 205 include, but are not limited to, nickel, stainless steel, metal oxides, high heat-resistant polymers, such as polytetrafluoroethylene (PTFE), ceramics and minerals.

Bonder 201 may be used in a manner analogous to that described above for bonder 51. (For example, bonder 201 may be operated at a temperature of about 400° F., for a contact time of about 2 seconds at a pressure of about 40-60 psi.) However, because of the presence of device 205 in bonder 201, the visibility of any resulting die-mark will be reduced.

As can be appreciated, bonder 201 is not limited to use with assembly 101 and may be used with a wide range of heat-transfer label assemblies including assembly 11. Also, it should be understood that bonder 201 could be modified by replacing the combination of device 205 and pad 53 with a replacement pad that additionally possesses the features of device 205.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. An apparatus for applying a heat-transfer label to an article, the apparatus comprising:
    (a) a pad;
    (b) a die-mark reduction device, the die-mark reduction device being positioned over the pad, the die-mark reduction device having a top, the top being contoured to include a plurality of contact areas and a plurality of non-contact areas, wherein the die-mark reduction device is a nickel retroreflective sheeting mold;
    (c) a heated die, the heated die being positioned over the die-mark reduction device; and
    (d) means for moving the heated die into and out of engagement with a plurality of the contact areas of the die-mark reduction device, the heated die not engaging the non-contact areas of the die-mark reduction device;
    (e) wherein the non-contact areas of the die-mark reduction device are positioned at a depth farther away from the heated die than are the contact areas of the die-mark reduction device and wherein the contact areas have a maximum width of approximately 125 microns and a maximum depth of approximately 100 microns.

2. An apparatus for applying a heat-transfer label to an article, the apparatus comprising:
    (a) a pad;
    (b) a die-mark reduction device, the die-mark reduction device being positioned over the pad, the die-mark reduction device having a top;
    (c) a heated die, the heated die being positioned over the top of the die-mark reduction device; and
    (d) means for moving the heated die into and out of engagement with the top of the die-mark reduction device;
    (e) wherein the top of the die-mark reduction device is contoured to include a plurality of recesses spaced apart from one another by a plurality of spaces between the recesses, the recesses projecting away from the heated die and constituting non-contact areas, the spaces between the recesses being positioned at a depth closer to the heated die than are the recesses and constituting contact areas, the heated die, when engaged with the die-mark reduction device, simultaneously engaging a plurality of contact areas without engaging the non-contact areas located between the engaged contact areas, and wherein the recesses have a maximum width of approximately 125 microns and a maximum depth of approximately 100 microns.

3. The apparatus as claimed in claim 2 wherein the recesses have a shape, in plan view, selected from the group consisting of triangular, square, hexagonal, rectangular and circular.

4. The apparatus as claimed in claim 2 wherein the recesses are pyramidal in shape.

5. An apparatus for applying a heat-transfer label to an article, the apparatus comprising:
    (a) a pad;
    (b) a die-mark reduction device, the die-mark reduction device being positioned over the pad, the die-mark reduction device having a top;
    (c) a heated die, the heated die being positioned over the top of the die-mark reduction device; and
    (d) means for moving the heated die into and out of engagement with the top of the die-mark reduction device;
    (e) wherein the top of the die-mark reduction device is contoured to include a plurality of protrusions spaced apart from one another by a plurality of spaces between the protrusions, the protrusions projecting towards from the heated die and constituting contact areas, the spaces between the protrusions being positioned at a depth farther from the heated die than are the protrusions and constituting non-contact areas, the heated die, when engaged with the die-mark reduction device, simultaneously engaging a plurality of contact areas without engaging the non-contact areas located between the engaged contact areas, and wherein the protrusions have a maximum width of approximately 125 microns and a maximum depth of approximately 100 microns.

6. The apparatus as claimed in claim 5 wherein the protrusions are pyramidal in shape.

7. The apparatus as claimed in claim 5 wherein the ratio of non-contact area to contact area of the top of the die-mark reduction device is greater than 1:1.

8. The apparatus as claimed in claim 7 wherein the ratio of non-contact area to contact area of the top of the die-mark reduction device is in the range of about 1000:1 to 10:1.

9. The apparatus as claimed in claim 5 wherein the die-mark reduction device is made of a material selected from the group consisting of nickel, stainless steel, metal oxides, high heat-resistant polymers, ceramics and minerals.

10. The apparatus as claimed in claim 5 wherein the pad is made of silicone rubber.

11. The apparatus as claimed in claim 5 wherein said heated die has a footprint that corresponds to that of the heat-transfer label being transferred.

12. An apparatus for applying a heat-transfer label to an article, the apparatus comprising:
(a) a heated die;
(b) means for engaging the heated die so as to press an article therebetween, the engaging means having a contoured face, wherein the contoured face is shaped to include a plurality of recesses spaced apart from one another by a plurality of spaces between the recesses, the recesses projecting away from the heated die and constituting non-contact areas, the spaces between the recesses constituting contact areas, the heated die, when engaged with the contoured face, simultaneously engaging a plurality of contact areas, the contact areas being positioned at a depth closer to the heated die than are the non-contact areas, the recesses having a maximum width of approximately 125 microns and a maximum depth of approximately 100 microns; and
(c) means for moving the heated die into and out of engagement with the engaging means, wherein, when the heated die is in engagement with the engaging means, the heated die engages a plurality of the contact areas but does not engage the non-contact areas.

13. The apparatus as claimed in claim 12 wherein said engaging means comprises a pad and a member positioned over the pad, the member having the contoured face.

14. An apparatus for applying a heat-transfer label to an article, the apparatus comprising:
(a) a heated die;
(b) means for engaging the heated die so as to press an article therebetween, the engaging means having a contoured face, wherein the contoured face is shaped to include a plurality of protrusions spaced apart from one another by a plurality of spaces between the protrusions, the protrusions projecting towards the heated die and constituting contact areas, the spaces between the protrusions constituting non-contact areas, the heated die, when engaged with the contoured face, simultaneously engaging a plurality of contact areas, the protrusions having a maximum width of approximately 125 microns and a maximum height of approximately 100 microns; and
(c) means for moving the heated die into and out of engagement with the engaging means, wherein, when the heated die is in engagement with the engaging means, the heated die engages a plurality of the contact areas but does not engage the non-contact areas.

15. An apparatus for applying a heat-transfer label to an article, the apparatus comprising:
(a) a pad;
(b) a heated die;
(c) a die-mark reduction device, the die-mark reduction device being positioned over the pad and under the heated die, the die-mark reduction device having a top, the top being contoured to include a plurality of contact areas and a plurality of non-contact areas, the contact areas being positioned at a depth closer to the heated die than the non-contact areas, wherein the die-mark reduction device is a nickel retroreflective sheeting mold; and
(d) a motor that is coupled to the heated die and that is configured to move the heated die into and out of engagement with a plurality of the contact areas of the die-mark reduction device, the heated die not engaging the non-contact areas of the die-mark reduction device;
(e) wherein the contact areas have a maximum width of approximately 125 microns and a maximum depth of approximately 100 microns.

16. An apparatus for applying a heat-transfer label to an article, the apparatus comprising:
(a) a pad;
(b) a heated die;
(c) a die-mark reduction device, the die-mark reduction device being positioned over the pad and under the heated die, the die-mark reduction device having a top, wherein the top of the die-mark reduction device is contoured to include a plurality of recesses spaced apart from one another by a plurality of spaces between the recesses, the recesses projecting away from the heated die and constituting non-contact areas, the spaces between the recesses constituting contact areas, the heated die, when engaged with the die-mark reduction device, simultaneously engaging a plurality of contact areas, wherein the recesses have a maximum width of approximately 125 microns and a maximum depth of approximately 100 microns; and
(d) a motor that is coupled to the heated die and that is configured to move the heated die into and out of engagement with a plurality of the contact areas of the die-mark reduction device, the heated die not engaging the non-contact areas of the die-mark reduction device.

17. The apparatus as claimed in claim 16 wherein the recesses have a shape, in plan view, selected from the group consisting of triangular, square, hexagonal, rectangular and circular.

18. The apparatus as claimed in claim 16 wherein the recesses are pyramidal in shape.

19. Apparatus for applying a heat-transfer label to an article, the apparatus comprising:
(a) a pad;
(b) a heated die;
(c) a die-mark reduction device, the die-mark reduction device being positioned over the pad and under the heated die, the die-mark reduction device having a top, wherein the top of the die-mark reduction device is contoured to include a plurality of protrusions spaced apart from one another by a plurality of spaces between the protrusions, the protrusions constituting contact areas, the spaces between the protrusions constituting non-contact areas, the heated die, when engaged with the die-mark reduction device, simultaneously engaging a plurality of contact areas, wherein the protrusions have a maximum width of approximately 125microns and a maximum height of approximately 100 microns; and (d) a motor that is coupled to the heated die and that is configured to move the heated die into and out of engagement with a plurality of the contact areas of the die-mark reduction device, the heated die not engaging the non-contact areas of the die-mark reduction device.

20. The apparatus as claimed in claim 19 wherein the protrusions are pyramidal in shape.

21. The apparatus as claimed in claim 19 wherein the ratio of non-contact area to contact area of the top of the die-mark reduction device is greater than 1:1.

22. The apparatus as claimed in claim 21 wherein the ratio of non-contact area to contact area of the top of the die-mark reduction device is in the range of about 1000:1 to 10:1.

23. The apparatus as claimed in claim 19 wherein the die-mark reduction device is made of a material selected from the group consisting of nickel, stainless steel, metal oxides, high heat-resistant polymers, ceramics and minerals.

24. The apparatus as claimed in claim 19 wherein the pad is made of silicone rubber.

25. The apparatus as claimed in claim 19 wherein said heated die has a footprint that corresponds to that of the heat-transfer label being transferred.

26. The apparatus as claimed in claim 23 wherein the die-mark reduction device is made of nickel.

27. An apparatus for applying a heat-transfer label to an article, the apparatus comprising:

(a) a pad;
(b) a heated die;
(c) a die-mark reduction device, wherein the die-mark reduction device is a nickel retroreflective sheeting mold, the nickel retroreflective sheeting mold having a top that is contoured to include a plurality of recesses spaced apart from one another by a plurality of spaces between the recesses, the recesses constituting non-contact areas, the spaces between the recesses constituting contact areas, the heated die, when engaged with the die-mark reduction device, simultaneously engaging a plurality of contact areas, the recesses being pyramidal in shape and having a maximum with of approximately 125 microns and a maximum depth of approximately 100 microns; and (d) a motor that is coupled to the heated die and that is configured to move the heated die into and out of engagement with a plurality of the contact areas of the die-mark reduction device, the heated die not engaging the non-contact areas of the die-mark reduction device.

28. An apparatus for applying a heat-transfer label to an article, the apparatus comprising:

(a) a pad;
(b) a heated die;
(c) a die-mark reduction device, wherein the die-mark reduction device is a nickel retroreflective sheeting mold, the nickel retroreflective sheeting mold having a top that is contoured to include a plurality of protrusions spaced apart from one another by a plurality of spaces between the protrusions, the protrusions constituting contact areas, the spaces between the protrusions constituting non-contact areas, the heated die, when engaged with the die-mark reduction device, simultaneously engaging a plurality of contact areas, the protrusions being pyramidal in shape and having a maximum with of approximately 125 microns and a maximum depth of approximately 100 microns; and (d) a motor that is coupled to the heated die and that is configured to move the heated die into and out of engagement with a plurality of the contact areas of the die-mark reduction device, the heated die not engaging the non-contact areas of the die-mark reduction device.

* * * * *